US009678380B2

(12) United States Patent
Kwak et al.

(10) Patent No.: US 9,678,380 B2
(45) Date of Patent: Jun. 13, 2017

(54) LIQUID CRYSTAL DISPLAY AND METHOD OF MANUFACTURING THE SAME

(71) Applicant: Samsung Display Co., Ltd., Yongin-si (KR)

(72) Inventors: Chang Hun Kwak, Suwon-si (KR); Sang Hun Lee, Suwon-si (KR); Chul Huh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/856,118

(22) Filed: Sep. 16, 2015

(65) Prior Publication Data

US 2016/0202542 A1 Jul. 14, 2016

(30) Foreign Application Priority Data

Jan. 12, 2015 (KR) ........................ 10-2015-0004338

(51) Int. Cl.

| | |
|---|---|
| ***G02F 1/1335*** | (2006.01) |
| ***G02F 1/1333*** | (2006.01) |
| ***G02F 1/1362*** | (2006.01) |
| ***G02F 1/1343*** | (2006.01) |
| ***G02F 1/1339*** | (2006.01) |
| ***G02F 1/161*** | (2006.01) |
| ***G02F 1/01*** | (2006.01) |
| ***G02F 1/1337*** | (2006.01) |

(52) U.S. Cl.

CPC ...... *G02F 1/133512* (2013.01); *G02F 1/0107* (2013.01); *G02F 1/1337* (2013.01); *G02F 1/1339* (2013.01); *G02F 1/13394* (2013.01); *G02F 1/161* (2013.01); *G02F 2001/13398* (2013.01); *G02F 2001/133388* (2013.01); *G02F 2001/136222* (2013.01)

(58) Field of Classification Search

CPC ............... G02F 1/1339; G02F 1/13394; G02F 2001/13398; G02F 1/161; G02F 1/0107; G02F 1/1337; G02F 1/133711; G02F 1/133723; G02F 2001/133388; G02F 1/133512; G02F 1/136209; G02F 1/133514; G02F 2001/136222; G02F 1/1341

See application file for complete search history.

(56) References Cited

U.S. PATENT DOCUMENTS

2007/0184363 A1* 8/2007 Kim ...................... G02B 5/223 430/7
2009/0296190 A1* 12/2009 Anderson ............... B32B 27/06 359/247

(Continued)

FOREIGN PATENT DOCUMENTS

KR 10-2008-0022447 3/2008
KR 10-0850398 8/2008

(Continued)

*Primary Examiner* — Paul Lee
*Assistant Examiner* — Jia Pan
(74) *Attorney, Agent, or Firm* — H.C. Park & Associates, PLC

(57) ABSTRACT

A liquid crystal display includes: a substrate including a display region and a non-display region, a light leakage preventing layer disposed on the substrate along the non-display region, a step providing layer disposed on the light leakage preventing layer, and a hydrophobic layer disposed on the step providing layer.

9 Claims, 8 Drawing Sheets

(56) References Cited

U.S. PATENT DOCUMENTS

2010/0309416 A1* 12/2010 Gotoh .............. G02F 1/133514 349/123
2011/0013125 A1* 1/2011 Lee .................. G02F 1/133711 349/106
2011/0233572 A1* 9/2011 Nakatani ............ H01L 27/3246 257/88
2011/0316764 A1* 12/2011 Parry-Jones ......... G02B 26/005 345/60
2013/0329155 A1 12/2013 Kwak et al.
2014/0049717 A1 2/2014 Kwak et al.
2015/0062515 A1* 3/2015 Tomioka .......... G02F 1/133788 349/123
2015/0131041 A1* 5/2015 Moriwaki ............ G02F 1/1337 349/106
2015/0160486 A1* 6/2015 Wu ...................... G02F 1/1339 349/153
2015/0192816 A1* 7/2015 Shih ..................... G02F 1/1339 349/42

FOREIGN PATENT DOCUMENTS

KR 10-1096687 12/2011
KR 10-2013-0137457 12/2013

* cited by examiner

A
B
200
3
100
270
210
21
300
11
191
220a
230G
185
230R
133b
230B
110
133a
163
173
124
175
165
131
154
140
220b
VIII
221
231
125
310 mask
0%
100%
20%
191
220a
230G
185
230R
133b
230B
110
133a
163
173
124
175
165
131
154
140
231
125

| Classification | PI Thickness : After Pre-cure 800Å<br>Dotting interval : 80um, Amount of Dotting 78pL (Equipment of Ishihyoki. Ltd) | |
|---|---|---|
| | Five times | Ten times |
| BCS<br>Full tone | BCS Full tone surface<br>PI solution (Large flowability) | <br> |
| BCS<br>Half tone | BCS Halt tone surface<br>PI solution (Small flowabiliyt) | PI solution |

LIQUID CRYSTAL DISPLAY AND METHOD OF MANUFACTURING THE SAME

CROSS-REFERENCE TO RELATED APPLICATION

This application claims priority from and the benefit of Korean Patent Application No. 10-2015-0004338, filed on Jan. 12, 2015, which is hereby incorporated by reference for all purposes as if fully set forth herein.

BACKGROUND

Field

Exemplary embodiments relate to a liquid crystal display and a method of manufacturing the same.

Discussion of the Background

A liquid crystal display (LCD) is a popular type of flat panel display (FPD). The liquid crystal display includes two sheets of display panels on which electric field generating electrodes are formed, and a liquid crystal layer interposed therebetween. The liquid crystal display is configured to determine directions of liquid crystal molecules in a liquid crystal layer by applying a voltage to the electric field generating electrodes and generating an electric field on the liquid crystal layer, thereby adjusting transmittance of light passing through the liquid crystal layer.

The liquid crystal displays may include a structure in which each of the two electric field generating electrodes are respectively formed in the two display panels. According to one known design, the structure may include a plurality of pixel electrodes arranged in matrix shape on one display panel, and one common electrode disposed on a front surface of the other display panel.

According to the above-mentioned liquid crystal display, an image is displayed by applying a separate voltage to each pixel electrode. Accordingly, a liquid crystal display may include a switching element, such as a thin film transistor (TFT), configured to apply voltage to the connected pixel electrode, and a gate line configured to transfer a signal for controlling the thin film transistor and a data line configured to transfer the voltage to be applied to the pixel electrode. The thin film transistor serves as a switching element configured to transfer and/or interrupt the data signal transferred through the data line to the pixel electrode, in response to a scan signal transferred through the gate line.

When the liquid crystal molecules are injected between the display panels, the liquid crystal molecules may overflow over a display region and/or curl back into the display region. Accordingly, the liquid crystal molecules may not be distributed evenly between both the display panels and/or be concentrated at one portion, thereby causing a non-uniform cell gap.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display and a method for manufacturing the same configured to reduce or prevent an overflow and/or curl of liquid crystal and polyimide solution by suppressing or reducing flowability of the liquid crystal molecules and the polyimide solution.

Additional aspects will be set forth in the detailed description which follows, and, in part, will be apparent from the disclosure, or may be learned by practice of the inventive concept.

According to exemplary embodiments, a liquid crystal display includes: a substrate including a display region and a non-display region; a light leakage preventing layer disposed on the substrate along the non-display region; a step providing layer disposed on the light leakage preventing layer; and a hydrophobic layer disposed on the step providing layer.

According to exemplary embodiments, a method for manufacturing a liquid crystal display includes: forming a substrate including a display region and a non-display region; forming a light blocking member on the substrate along the non-display region; and forming a hydrophobic layer by exposing the light blocking member to light through a mask, the mask including a transflective pattern, wherein the hydrophobic layer is formed corresponding to the transflective pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
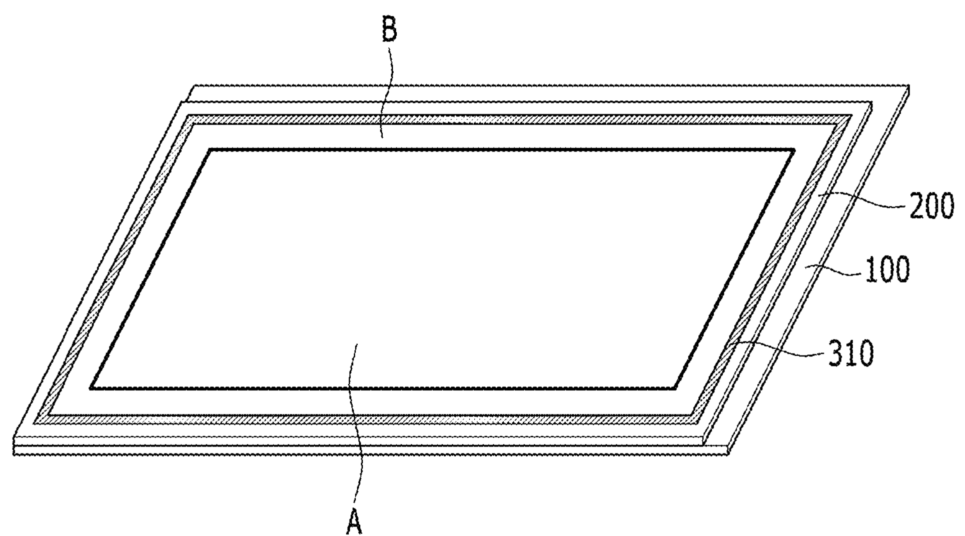
FIG. 1 is a perspective view of a liquid crystal display according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a liquid crystal display according to one or more exemplary embodiments will be described in detail with reference to FIGS. 1, 2, and 3. FIG. 1 is a perspective view of a liquid crystal display according to one or more exemplary embodiments, FIG. 2 is a plan view showing the liquid crystal display of FIG. 1, and FIG. 3 is a cross-sectional view taken along a section line III-III of the liquid crystal display of FIG. 2.

Figure 2:
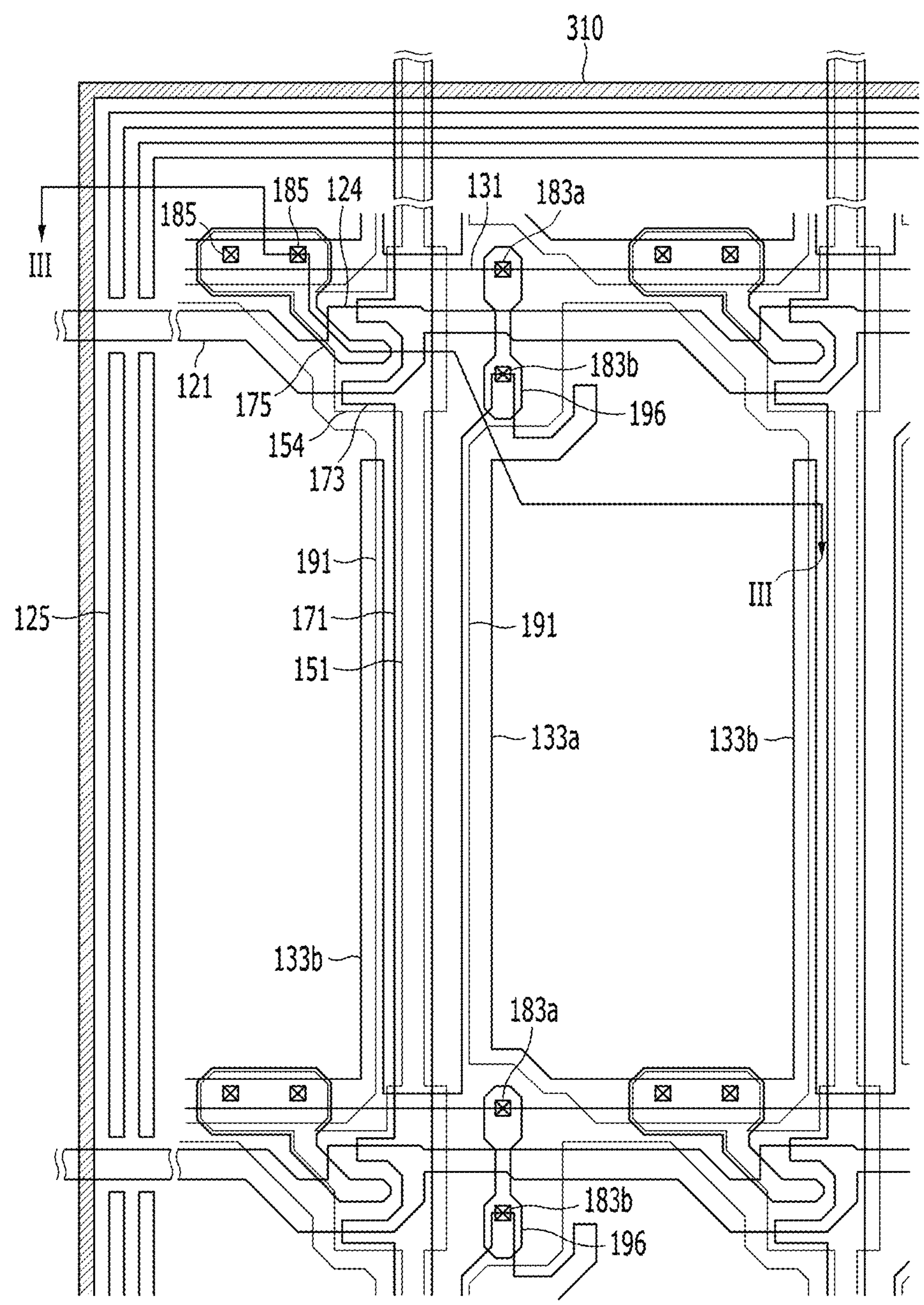
FIG. 2 is a plan view showing the liquid crystal display of FIG. 1, according to one or more exemplary embodiments.
Figure 3:
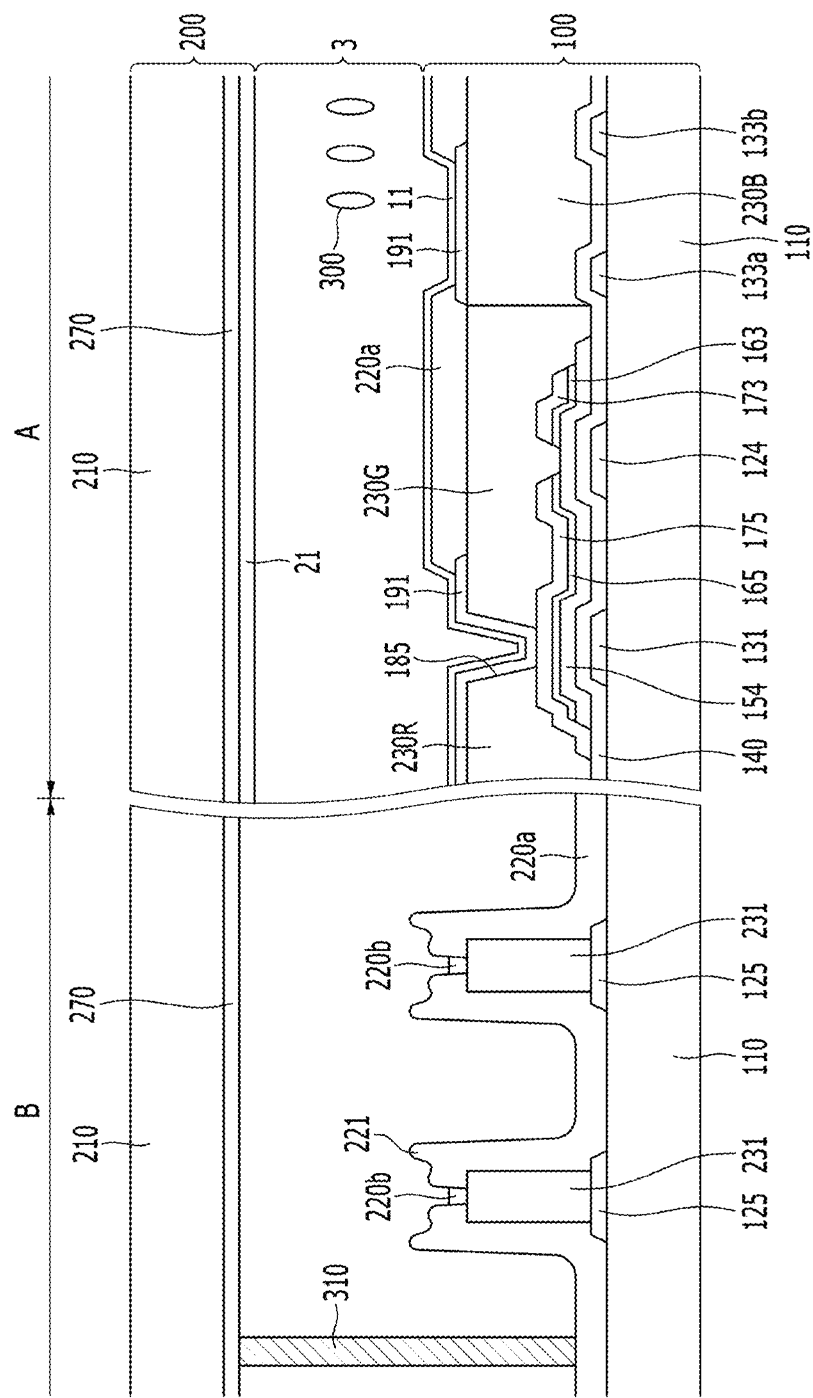
FIG. 3 is a cross-sectional view taken along a sectional line III-III of the liquid crystal display of FIG. 2.

Referring to FIGS. 1, 2, and 3, the liquid crystal display according to an exemplary embodiment of the present invention includes a thin film transistor display panel 100 and a common electrode display panel 200 disposed facing each other, and a liquid crystal layer 3 interposed between the thin film transistor display panel 100 and the common electrode display panel 200. The liquid crystal display includes a display region A for displaying an image and a non-display region B for a connection with an external driving circuit.

First, the display region A of the thin film transistor display panel 100 will be described. A plurality of gate lines 121 and a plurality of storage electrode lines 131 are disposed on an insulating substrate 110 including at least one of transparent glass, plastic, and the like.

The gate line 121 transfers a gate signal and extends substantially in a horizontal direction. The gate line 121 includes a plurality of gate electrodes 124 protruding toward a lower direction and wide end portions (not shown) configured to provide a connection with other layers and/or external driving circuits. The gate driving circuit (not shown) generating the gate signal may be mounted on a flexible printed circuit film (not shown) attached onto the substrate 110, or may be directly mounted on the substrate 110, or may be integrated on the substrate 110. In the case in which the gate driving circuit is integrated on the substrate 110, the gate line 121 may be extended so as to be directly connected to the gate driving circuit 110.

A predetermined voltage is applied to the storage electrode line 131, which includes a stem line extended so as to be substantially in parallel to the gate line 121, as well as a plurality of pairs of first and second storage electrodes **133*a* and 133*b* branched from the stem line. The storage electrode line 131 is disposed between two adjacent gate lines 121, and the stem line of the storage electrode line 131 is disposed closer to a lower gate line 121 of the two adjacent gate lines 121. Each of the first and second storage electrodes 133*a* and 133*b* have a fixing terminal connected to the stem line and a free terminal which is opposite to the fixing terminal. The first storage electrode 133*a* has the fixing terminal having a relatively wider area and the free terminal branched into two portions, including a straight portion and a curved portion. However, the shape and the arrangement of the storage electrode line 131** is not limited thereto, and may be variously modified.

The gate line 121 and the storage electrode line 131 may be made of at least one of an aluminum (Al) based metal such as aluminum, an aluminum alloy, and the like, a silver (Ag) based metal such as silver, a silver alloy, and the like, a copper (Cu) based metal such as copper, a copper alloy, and the like, a molybdenum (Mo) based metal such as molybdenum, a molybdenum alloy, and the like, chromium (Cr), tantalum (Ta), titanium (Ti), and the like. However, the gate line 121 and the storage electrode line 131 may have a multilayer structure including two conductive layers (not shown) having different physical properties. For example, one conductive layer among the two conductive layers may be made of a metal having low resistivity, including an aluminum based metal, a silver based metal, a copper based metal, and the like, in order to reduce a signal delay and/or a voltage drop. The other conductive layer may be made of a material having excellent physical, chemical, and electrical contact characteristics in connection with indium tin oxide (ITO) and indium zinc oxide (IZO), for example, a molybdenum based metal, chromium, tantalum, titanium, and the like Specifically, the gate line 121 and the storage electrode line 131 having a multilayer structure may include a chromium lower layer and an aluminum (alloy) upper layer, or an aluminum (alloy) lower layer and a molybdenum (alloy) upper layer. However, the multilayer structure of the gate line 121 and the storage electrode line 131 is not limited thereto, and may be made of various suitable metals and/or conductors.

The gate line 121 and the storage electrode line 131 may include sides inclined with respect to a surface of the substrate 110 at an inclined angle of about 30° to about 80°.

A gate insulating layer 140 made of silicon nitride ($SiN_X$) and/or silicon oxide ($SiO_X$) is formed on the gate line 121 and the storage electrode line 131.

A plurality of linear semiconductors 151 made of hydrogenated amorphous silicon (for short, a-Si), polysilicon, and the like may be disposed on the gate insulating layer 140. The linear semiconductor 151 extends substantially in the vertical direction and includes a plurality of projections 154 extending toward the gate electrode 124.

A plurality of linear ohmic contacts (not shown) and island-shape ohmic contacts 165 are formed on the semiconductor 151. The plurality of linear ohmic contacts may be made of a material including at least one of n+ hydrogenated amorphous silicon which is heavily doped with n-type impurities such as phosphorus (P), and/or silicide. The linear ohmic contacts (not shown) include a plurality of projections 163, and the projections 163 and the island-shape ohmic contacts 165 are disposed on the projections 154 of the semiconductor 151 in pairs.

The semiconductor 151 and the ohmic contacts may also include sides inclined with respect to the substrate 110 at an angle. The inclined angle of the sides of the semiconductor 151 and the ohmic contacts may be about 30° to 80°.

A plurality of data lines 171 and a plurality of drain electrodes 175 are formed on the ohmic contacts and the gate insulating layer 140. The data line 171 is configured to transfer a data signal and extends substantially in a vertical direction crossing the gate line 121. The data line 171 also crosses the storage electrode lines 131 extending between the respective pair of storage electrodes 133*a* and 133*b*. The gate line 171 includes a plurality of source electrodes 173 which extends toward the gate electrode 124 and wide end portions (not shown) configured to provide a connection with other layers and/or external driving circuits. The data driving circuit (not shown), configured to generate the data signal, may be mounted on a flexible printed circuit film (not shown) attached onto the substrate 110, or may be directly mounted on the substrate 110, or may be integrated on the substrate 110. In the case in which the data driving circuit is integrated on the substrate 110, the data line 171 may be extended and be directly connected to the data driving circuit.

The drain electrode 175 is separated from the data line 171 and is disposed facing the source electrode 173 with respect to the gate electrode 124.

One gate electrode 124, one source electrode 173, and one drain electrode 175 form one thin film transistor (TFT) together with the projection of the semiconductor layer 154, and a channel of the thin film transistor is formed in the projection 154 between the source electrode 173 and the drain electrode 175.

The data line 171 and the drain electrode 175 may be made of a refractory metal including at least one of molybdenum, chromium, tantalum, titanium, and the like, and an alloy thereof, and may have a multilayer structure including a refractory metal layer (not shown) and a low resistance conductive layer (not shown). For example, the multilayer structure may include a double layer of a chromium and/or molybdenum (alloy) lower layer and an aluminum (alloy) upper layer, and a triple layer of a molybdenum (alloy) lower layer, an aluminum (alloy) middle layer, and a molybdenum (alloy) upper layer. However, the multilayer structure of the data line 171 and the drain line 175 is not limited thereto, and may be made of various metals and/or conductors.

The data line 171 and the drain electrode 175 may include sides inclined with respect to the surface of the substrate 110 at an inclined angle of about 30° to about 80°.

Color filters 230R, 230G, and 230B are formed on portions of the data line 171, the drain electrode 175, and the exposed semiconductor 151. The color filters 230R, 230G, and 230B may extend along a column of pixel electrodes 191, and may have a flat surface. Each of the color filters 230R, 230G, and 230B are configured to respectively display one of primary colors, such as the three primary colors of red, green, and blue. However, the color that the color filter may display is not limited to the three primary colors such as red, green, and blue. For example, the color filters may also display one of cyan, magenta, yellow, and white.

The color filters 230R, 230G, and 230B are provided with a plurality of contact holes 185 exposing the drain electrode 175, and the color filters 230R, 230G, and 230B and the gate insulating layer 140 are provided with a plurality of contact holes 183*a* exposing a portion of the storage electrode line 131 near a fixing terminal of the first storage electrode 133*a* and the plurality of contact holes 183*b* exposing the projection of the free terminal of the first storage electrode 133*a*.

The plurality of pixel electrodes 191 and a plurality of overpasses 196 are formed on the color filters 230R, 230G, and 230B. The plurality of pixel electrodes 191 and the plurality of overpasses 196 may be made of a transparent conductive material including at least one of an ITO, an IZO, and the like, or a reflective metal including at least one of aluminum, silver, chromium, and an alloy thereof.

The pixel electrode 191 is physically and electrically connected to the drain electrode 175 through the contact hole 185 and is applied with a data voltage from the drain electrode 175. The pixel electrode 191, to which the data voltage is applied, is configured to generate an electric field with the common electrode 270 of the common electrode display panel 200, which is applied with the common voltage, thereby configured to align a direction of the liquid crystal molecules in the liquid crystal layer 3 between the pixel electrode 191 and the common electrode 270. The light passing through the liquid crystal layer 3 is polarized depending on the direction of the liquid crystal molecules determined as described above. The pixel electrode 191 and the common electrode 270 forms a capacitor (hereinafter, referred to as 'liquid crystal capacitor'), configured to maintain the applied voltage after the thin film transistor is turned off.

The pixel electrode 191 is overlapped with the storage electrode line 131 including the storage electrodes 133*a* and 133*b*, and a capacitor formed by overlapping the pixel electrode 191 and the drain electrode 175 electrically connected to the pixel electrode 191 with the storage electrode line 131 may referred to as a storage capacitor, which may enhance voltage storage capability of the liquid crystal capacitor.

The overpass 196 is disposed crossing the gate line 121 and is connected to an exposed portion of the storage electrode line 131 and an exposed end portion of the free terminal of the first storage electrode 133*a* through the contact holes 183*a* and 183*b* disposed at opposite ends of the over pass 196 with respect to the gate line 121. The storage electrode line 131 including the storage electrodes 133*a* and 133*b* may be used to repair a defect of the gate line 121, the data line 171, or the thin film transistor together with the overpass 196.

A light blocking member 220*a*, which may also be referred to as a black matrix, is formed on the color filter 230R, 230G, and 230B and the pixel electrode 191. The light blocking member 220*a* has a plurality of opening parts having approximately the same shape as the pixel electrode 191. The light blocking member 220*a* is configured to reduce or prevent light leakage between the pixel electrodes 191. The light blocking member 220*a* includes portions corresponding to the gate line 121 and the data line 171 and a portion corresponding to the thin film transistor. The light blocking member 220*a* is formed of a photosensitive material, and a portion of the photosensitive material not exposed to light may be removed.

An alignment layer 11 is disposed on the pixel electrode 191 and the light blocking member 220*a*. The alignment layer 11 is formed in the display region A, and thus, the alignment layer 11 may be made of an insulating material such as polyimide (PI).

Next, the non-display region B of the thin film transistor display panel 100 will be described.

Two lines of light leakage preventing layer 125 are disposed, spaced apart from each other, along a circumference of the non-display region B, which is defined by a sealant 310, and on the insulating substrate 110 made of transparent glass, plastics, and the like. The light leakage preventing layer 125 may be disposed in parallel to the gate line 121 and/or the data line 171, and may be made of the same material as the gate line 121. The light leakage preventing layer 125 is configured to reduce or prevent leakage of light provided from a backlight (not shown) disposed below the thin film transistor display panel 100 into the non-display region B through the hydrophobic layer 220*b*. Therefore, the light leakage preventing layer 125 is formed below the hydrophobic layer 220*b*, corresponding to a position and an area of the hydrophobic layer 220*b*.

A step providing layer 231 is formed on the light leakage preventing layer 125. Two lines of the step providing layer 231 are also disposed, spaced apart from each other, along the circumference of the non-display region B, which is defined by the sealant 310, and in parallel to the gate line 121 or the data line 171. The step providing layer 231 may be made of the same material as the color filters 230R, 230G, and 23B, and for example, may be made of the blue color filter 230B.

A hydrophobic layer 220*b* is disposed on the step providing layer 231. The hydrophobic layer 220*b* is also disposed in the region defined by the sealant 310 along the non-display region B and is disposed on the step providing layer 231. The hydrophobic layer 220*b* may have a relatively higher concentration of fluorine in an upper surface thereof and may be made of the same material as the light blocking member 220*a*. More specifically, the hydrophobic layer 220*b* may be formed by performing a transflective exposure to the light blocking member 220*a*.

The light blocking member 220*a* disposed in the display region A may also be continuously disposed in the non-display region B, wherein the light blocking member 220*a* is disposed overlapping a portion of the step providing layer 231, thereby forming an additional step part 221. The additional step part 221 refers to a double step layer which protrudes in a shoulder shape at left and right of the hydrophobic layer 220*b* in FIG. 3.

The hydrophobic layer 220*b*, due to its hydrophobic property, may be configured to suppress flowability of the liquid crystal molecules 300 and the polyimide solution, and the additional step part 221, like a dam, may reduce or prevent an overflow of the liquid crystal molecules 300 and the polyimide solution by increasing a height of the step providing layer 231. The light leakage preventing layer 125 may reduce or prevent leakage of light, provided from a backlight (not shown) disposed below the thin film transistor display panel 100, into the non-display region B through the hydrophobic layer 220*b*.

Next, the common electrode display panel 200 which is opposite to the thin film transistor display panel 100 will be described.

The common electrode 270, made of the transparent conductor such as ITO and/or IZO, may be disposed on the insulating substrate 210 made of transparent glass and/or plastics. An alignment layer 21 is disposed on the common electrode 270. The alignment layer 21 is disposed corresponding to the display region A, and may be made of an insulating material such as polyimide.

The thin film transistor display panel 100 and the common electrode display panel 200 are disposed facing each other, and are affixed to each other by the sealant 310. The sealant 310 is formed along the circumference of the display region A and defines a region of a closed-shell shape. The sealant 310 may have the same height as a cell gap and may be made of a photocurable resin and/or a thermosetting resin including at least one of an acrylic based resin, an epoxy based resin, an acrylic-epoxy based resin and a phenol resin.

The liquid crystal molecules 300 is disposed in the region defined by the sealant 310, and the hydrophobic layer 220*b*, the additional step part 221, and the step providing layer 231 may be configured to control a speed of the liquid crystal molecules 300 flowing out at the circumference of the display region A to the outside of the display region A. Therefore, the liquid crystal molecules 300 may be inhibited or prevented from being concentrated at edges of the display panels 100 and 200, and thereby, the liquid crystal molecules 300 may be uniformly maintain within the cell gap. The hydrophobic layer 220*b*, the additional step part 221, and the step providing layer 231 may be configured to suppress flowability of the liquid crystal molecules 300, and the liquid crystal molecules 300 may be inhibited or prevented from being curled into the display region A.

The sealant 310 may be cured by light and/or heat after both the display panels 100 and 200 are affixed with uncured sealant 310. The hydrophobic layer 220*b*, the additional step part 221, and the step providing layer 231 are configured to reduce or prevent the liquid crystal molecules 300 from being directly in contact with the uncured sealant 310, thereby inhibiting or preventing the liquid crystal molecules 300 from being contaminated from the uncured sealant 310.

Polarizers (not shown) may be provided on outer surfaces of the display panels 100 and 200, and polarizing axes of the two polarizers may be disposed in parallel or perpendicular to each other. In the case of a reflective liquid crystal display, one of two polarizers may be omitted.

The liquid crystal layer 3 has positive or negative dielectric constant anisotropy, and liquid crystal molecules 300 of the liquid crystal layer 3 are aligned so that major axes thereof are substantially in parallel or perpendicular to surfaces of the two display panels 100 and 200 without an electric field applied thereto.

Figure 4:
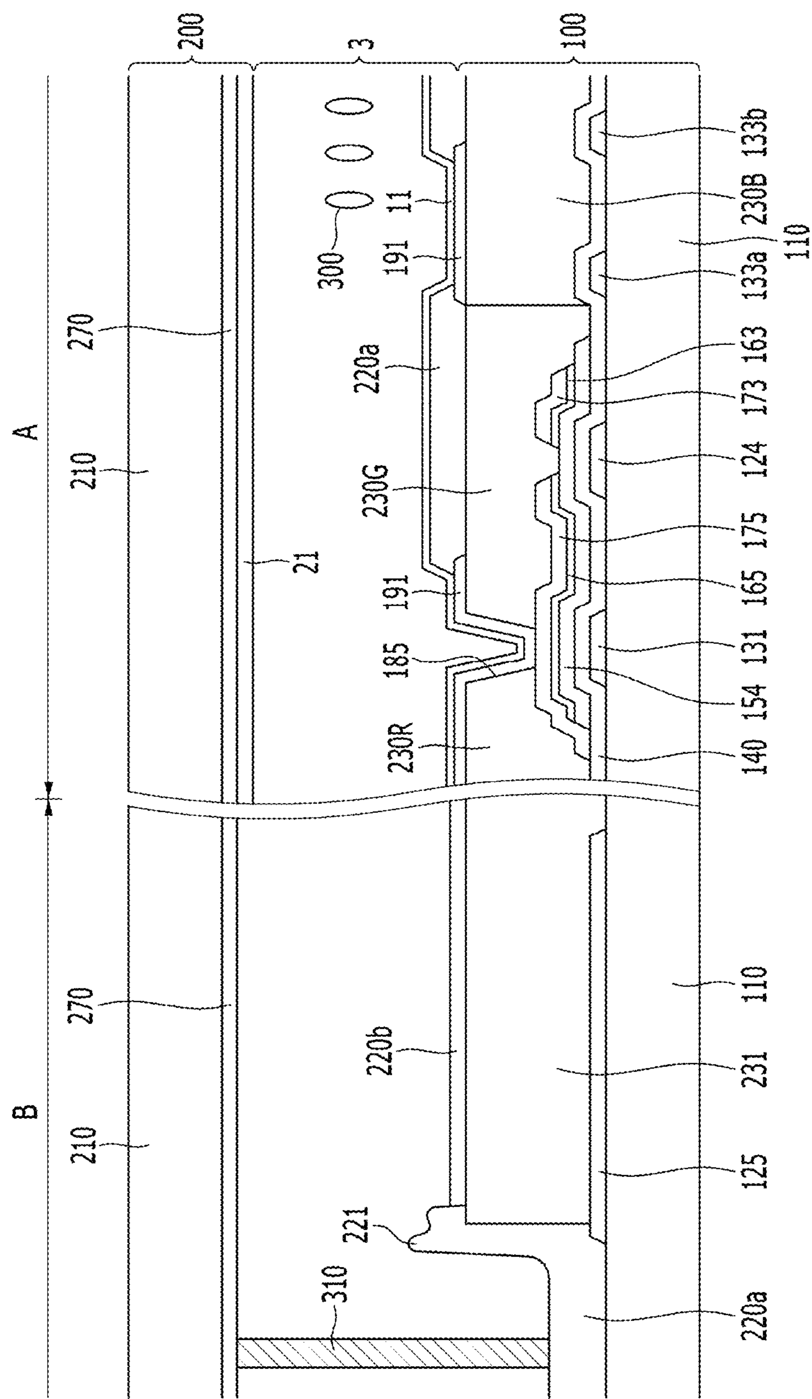
FIG. 4 is a cross-sectional view of a liquid crystal display according to one or more exemplary embodiments.

Hereinafter, a liquid crystal display according to one or more exemplary embodiments will be described in detail with reference to FIG. 4. FIG. 4 is a cross-sectional view of a liquid crystal display according to one or more exemplary embodiments. The descriptions regarding configuration and structure that are substantially identical to the exemplary embodiments described above are omitted, and the non-display region B of the thin film transistor display panel 100 of FIG. 4 will be described.

Referring to FIG. 4, a light leakage preventing layer 125 formed in one line may have a width wider than that of the light leakage preventing layer 125 illustrated in FIG. 3 along the circumference of the non-display region B, which is defined by a sealant 310 on the insulating substrate 110 made of transparent glass, plastics, and the like. The light leakage preventing layer 125 may be disposed in parallel to the gate line 121 and/or the data line 171, and may be made of substantially the same material as the gate line 121. The light leakage preventing layer 125 is configured to reduce or prevent leakage of light, provided from a backlight (not shown) disposed below the thin film transistor display panel 100, into the non-display region B through the hydrophobic layer 220*b*. Therefore, the light leakage preventing layer 125 is formed below the hydrophobic layer 220*b*, corresponding to a position and an area of the hydrophobic layer 220*b*.

A step providing layer 231 is formed on the light leakage preventing layer 125. The step providing layer 231 is also disposed near the circumference of the non-display region B, which is defined by the sealant 310, and in parallel to the gate line 121 or the data line 171. The step providing layer 231 may be made of the same material as the color filters 230R, 230G, and 23B, and for example, may be made of the blue color filter 230B.

A hydrophobic layer 220*b* is disposed on the step providing layer 231. The hydrophobic layer 220*b* is also disposed in the region defined by the sealant 310 along the non-display region B and is disposed on the step providing layer 231. The hydrophobic layer 220*b* may have a relatively higher concentration of fluorine in the upper surface thereof and may be made of the same material as the light blocking member 220*a*. More specifically, the hydrophobic layer 220*b* may be formed of a material obtained by performing a transflective exposure to the light blocking member 220*a*.

The light blocking member 220*a* disposed in the display region A may also be disposed in the non-display region B, wherein the light blocking member 220*a* is disposed overlapping a portion of the step providing layer 231, thereby forming an additional step part 221.

Referring to FIG. 4, the hydrophobic layer 220*b* having a wide area may be configured to suppress flowability of the liquid crystal molecules 300 and the polyimide solution, and the additional step part 221 formed at the left of the hydrophobic layer 220*b*, like a dam, may reduce or prevent an overflow of the liquid crystal molecules 300 and the polyimide solution, by increasing a height of the step providing layer 231. The light leakage preventing layer 125 may reduce or prevent leakage of light, provided from a backlight (not shown) disposed below the thin film transistor display panel 100, into the non-display region B through the hydrophobic layer 220*b*.

Figure 5:
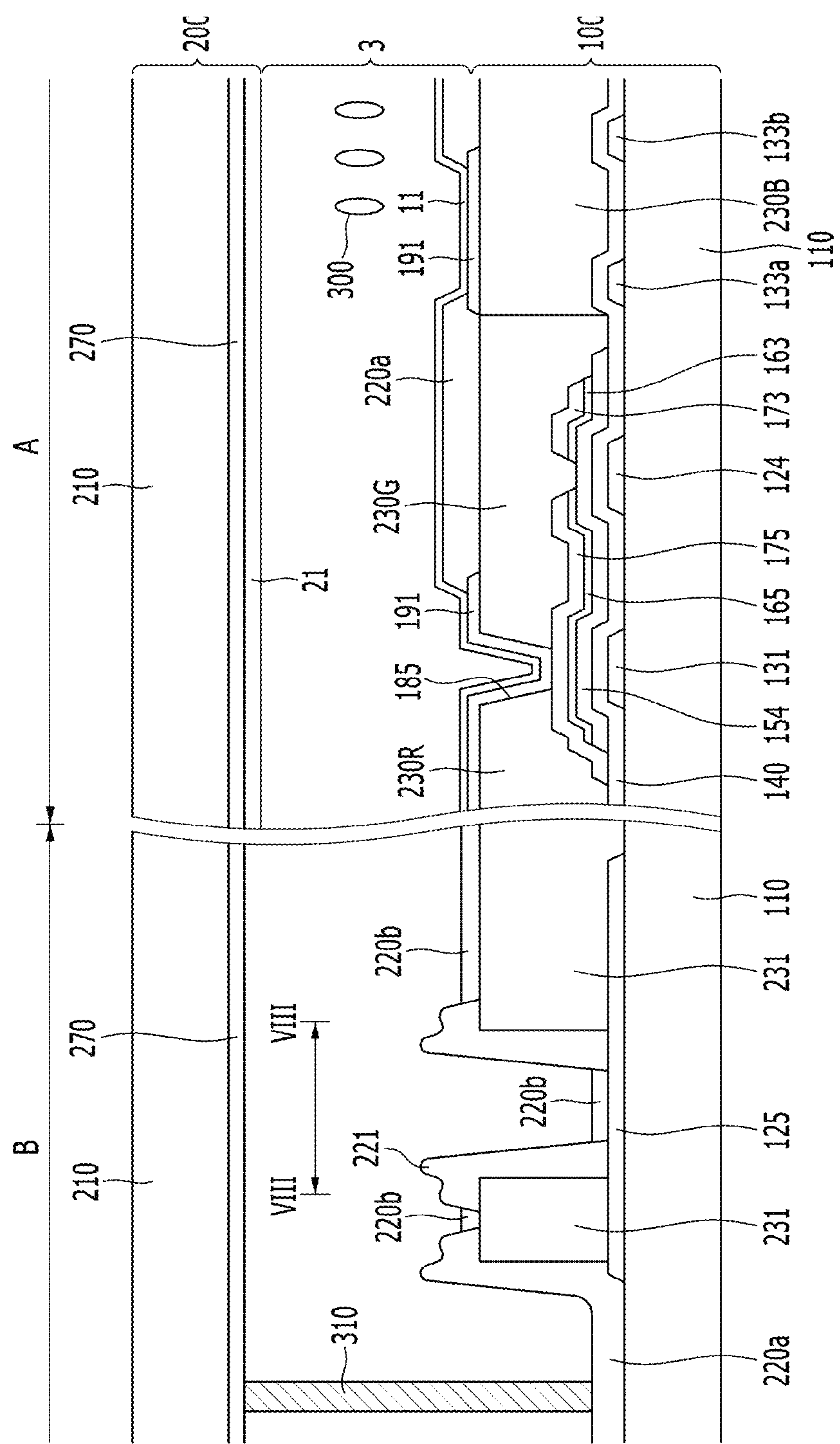
FIG. 5 is a cross-sectional view of a liquid crystal display according to one or more exemplary embodiments.
Figure 6:
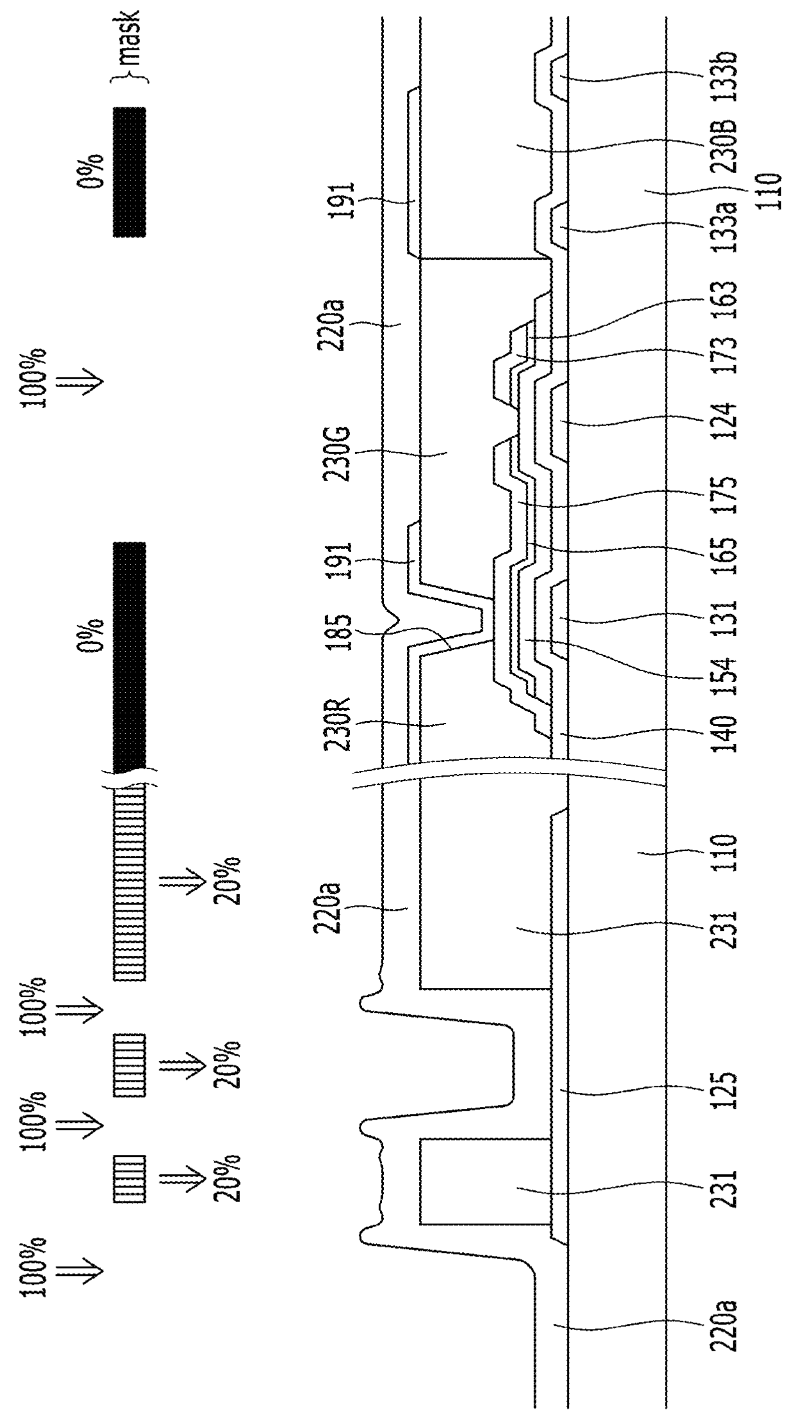
FIG. 6 is a diagram showing an exemplary method of forming a hydrophobic layer 220*b* for manufacturing a liquid crystal display according to the liquid crystal display illustrated in FIG. 5.
Figure 7:
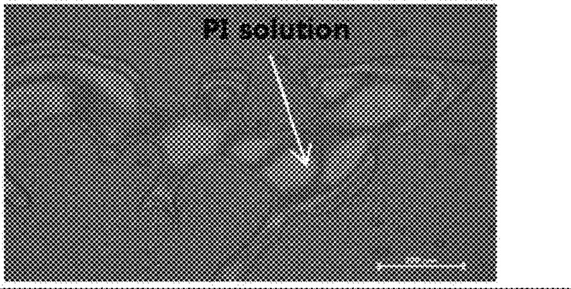
FIG. 7 is an experimental result showing an effect of the hydrophobic layer suppressing flowability of the PI solution, according to one or more exemplary embodiments.
Figure 8:
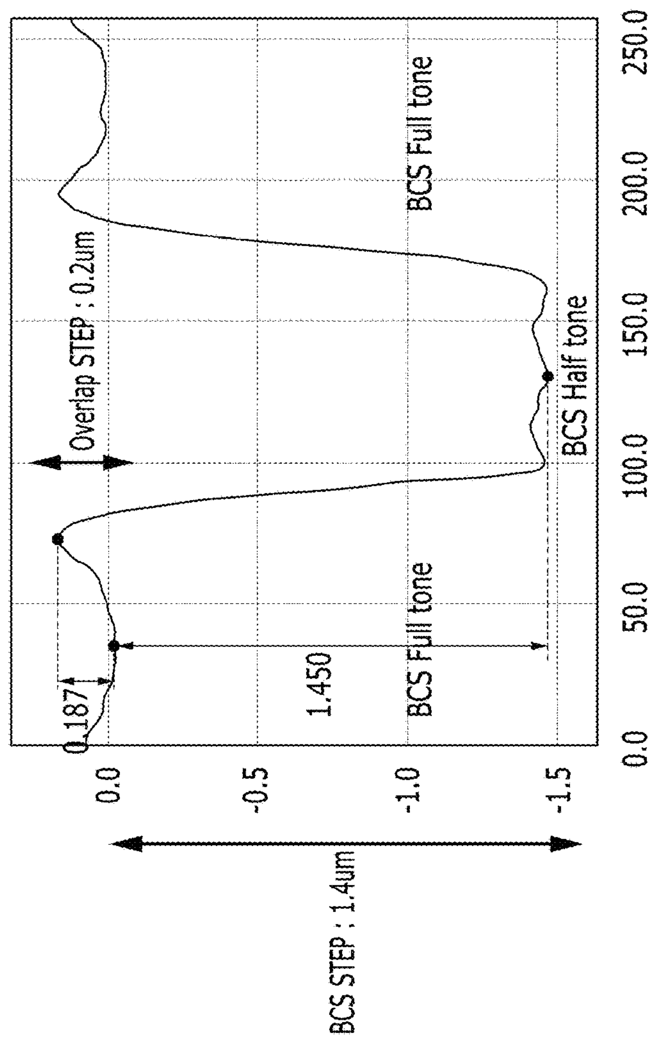
FIG. 8 is a graph illustrating an experimental result showing formation of an additional step layer, which is a graph representing a height measurement of a portion VIII-VIII of FIG. 5, according to one or more exemplary embodiments.

Hereinafter, a liquid crystal display and a method for manufacturing the same according to one or more exemplary embodiments and an effect thereof will be described in detail with reference to FIGS. 5, 6, 7, and 8. FIG. 5 is a cross-sectional view of a liquid crystal display according to one or more exemplary embodiments, and FIG. 6 is a diagram showing an exemplary method of forming a hydrophobic layer 220*b* for manufacturing a liquid crystal display according to the liquid crystal display illustrated in FIG. 5. FIG. 7 is an experimental result of the PI solution flowability suppressing effect of the hydrophobic layer 220*b*, according to one or more exemplary embodiments, and FIG. 8 is a graph comparing experimental results in response to including an additional step layer 221, which is a graph representing a height measurement of a portion VIII-VIII of FIG. 5, according to one or more exemplary embodiments.

The descriptions regarding configuration and structure that are substantially identical to the exemplary embodiments described above are omitted, and the non-display region B of the thin film transistor display panel 100 of FIG. 5 will be described.

Referring to FIG. 5, one line of a light leakage preventing layer 125, which has a width wider than that of a one line of the light leakage preventing layer 125 of FIG. 3, is formed along the circumference of the non-display region B, which is a region defined by the sealant 310 on the substrate 110. Two step providing layers 231 are formed on the light leakage preventing layer 125, spaced apart from each other, and a hydrophobic layer 220*b* is formed on the step providing layers 231. The light blocking member 220*a* is overlapped with corner portions of the step providing layer 231, forming the additional step providing part 221 at the corner portions of the step providing layer 231, and the light leakage preventing layer 125 and the hydrophobic layer 220*b* are disposed overlapping with each other between the two step providing layers 231, forming a deep well shape therebetween.

According to the exemplary method of manufacturing the liquid crystal display according to the exemplary embodiments illustrated in FIG. 5 above, a plurality of gate lines 121 including a gate electrode 124 made of an aluminum alloy, a plurality of storage electrode lines 131 including storage electrodes 133*a* and 133*b*, and the light leakage preventing layer 125 are formed on the substrate 110.

The gate insulating layer 140 and an intrinsic amorphous silicon layer (not shown) are sequentially disposed by plasma enhanced chemical vapor deposition (PECVD), and the amorphous silicon layer is photolithography-etched, thereby forming a plurality of linear semiconductors and projections 151 and 154. An impurity semiconductor (not shown) is disposed on the gate insulating layer 140 and the plurality of linear semiconductors and projections 151 and 154.

A source electrode 173, a data line 171, and a drain electrode 175, are formed that of an aluminum alloy.

A part of the impurity semiconductor, which is exposed and not covered by the source electrode 173 and the drain electrode 175, is completed by being removed, and thereby, the ohmic contacts 163 and 165 are formed.

The color filters 230R, 230G, and 230B and the step providing layer 231 are stacked and the color filters 230R, 230G, and 230B are etched, thereby forming a plurality of contact holes 183*a*, 183*b*, and 185. The pixel electrode 191 and a plurality of overpasses 196 are formed on the color filters 230R, 230G, and 230B.

Referring to FIG. 6, the light blocking member 220*a* is formed covering the non-display region B including the color filters 230R, 230G, and 230B, the pixel electrode 191, and the step providing layer 231. The light blocking member 220*a* is formed of a photosensitive material, and the portion of the photosensitive material not exposed to light may be removed.

Next, as shown in FIG. 6, a mask having three patterns is disposed on the light blocking member 220*a*, and the light blocking member 220*a* is exposed to light. The mask includes a maximum gray scale pattern configured to transmit 100% of an incident light, a transflective pattern configured to transmit 20% of the incident light, and a minimum gray scale pattern configured to transmit 0% of the incident light. The minimum gray scale pattern is disposed on the pixel electrode 191, the transflective pattern is disposed corresponding to the hydrophobic layer 220*b*, and the maximum gray scale pattern is disposed corresponding to light blocking members 220*a* disposed between the pixel electrodes 191 to prevent light leakage and disposed in the non-display region B except for the hydrophobic layer 220*b*. The portion of light blocking member 220*a* not exposed to the light may be removed and an opening part, having substantially the same shape as the pixel electrode 191, may be formed as shown in FIG. 5.

A portion of the light blocking member 220*a* disposed in the non-display region B, which is exposed to 20% of the incident light, may form the hydrophobic layer 220*b*, because only a portion of the light blocking member remains, as shown in FIG. 5. Also, in the light blocking member 220*a* exposed to 20% of the incident light, fluorine in the light blocking member 220*a* is brought up to the surface and fluorine content at the surface may be increased, and therefore, the light blocking member 220*a* becomes the hydrophobic layer 220*b*. Roughness of the surface of the layer is also increased. FIG. 7 is a photograph showing an experimental result of the PI solution flowability suppressing effect of the light blocking member 220*a* exposed to 20% of the incident light. The experimental result shows a degree of flowability of the PI solution in the case in which 78 pL of the PI solution is disposed in dots with an interval of 80 μm using, for example, equipment manufactured by Ishihyoki Co., Ltd., when the thickness of the liquid crystal layer PI is 800 Å. In FIG. 7, a BCS full tone refers to the light blocking member 220*a* which is exposed to 100% of the incident light, and a BCS half tone refers to the hydrophobic layer 220*b*. The PI solution disposed on the surface of the light blocking member 220*a* which is exposed to 100% of the incident light (BCS full tone surface) is spread out showing relatively higher flowability, and the PI solution disposed on the surface of the hydrophobic layer 220*b* (BCS half tone surface) is aggregated in a droplet form showing relatively lower flowability.

According to the exemplary embodiments, the mask including the transflective pattern configured to transmit 20% of the incident light is used to form the hydrophobic layer 220*b*, but the exemplary embodiments are not limited thereto. The mask may include a transflective pattern configured to transmit equal to or more than 15% to equal to or less than 25% of the incident light. The light transmittances of the maximum gray scale pattern and the minimum gray scale pattern are also illustrated as 100% and 0%, respectively, but the exemplary embodiments are not limited thereto. The light transmittances of the maximum gray scale pattern may be equal to or more than 95%, and the light transmittance of the minimum gray scale pattern may be equal to or less than 5%.

The light blocking member 220*a* disposed in the non-display region B, except for the hydrophobic layer 220*b*, is exposed to 100% of the incident light. The light blocking member 220*a* which is exposed by 100% remains as shown in FIG. 5. A portion of the light blocking member 220*a* exposed to 100% of the incident light, which is overlapped with a portion of the step providing layer 231, may form the additional step layer 221. The additional step layer 221 refers to a portion of the light blocking member 220*a* formed on the step providing layer 231, having a shoulder shape which has a height substantially double the height of other portions of the light blocking member 220*a*, as shown in FIG. 5. The additional step layer 221 may be formed by forming the light blocking member 220*a* to cover only a portion of the step providing layer 231. FIG. 8 is a graph illustrating an experimental result showing formation of the additional step layer 221, in which the step providing layer 231 is the blue color filter 230B. According to FIG. 8, the measured height of a portion VIII-VIII of FIG. 5 is represented as a curve graph. A horizontal axis of the curve graph represents an area and a vertical axis of the curve graph represents a height. Referring to FIG. 8, a BCS half tone refers to the hydrophobic layer 220*b* in the portion VIII-VIII in FIG. 5, and a BCS full tone refers to the light blocking member 220*a* disposed at both sides of the hydrophobic 220*b* in the portion VIII-VIII in FIG. 5. The additional step layer 221 is formed in a shoulder shape illustrated by protrusion over 0.0 μm of the vertical axis in the BCS full tone. In FIG. 8, a BCS step refers to a height difference between the light blocking member 220*a* (BCS full tone) and the hydrophobic layer 220*b* (BCS half tone), and an overlap step refers to a height of the additional step layer 221.

According to the graph of FIG. 8, the additional step layer 221 formed on the light blocking member 220*a* (BCS full tone) in the shoulder shape, may have a height about 0.2 μm (more specifically about 0.187 μm), when the height difference between the light blocking member 220*a* (BCS full tone) and the hydrophobic layer 220*b* (BCS half tone) is about 1.4 μm (more specifically about 1.450 μm).

In the display region A, the thin film transistor display panel 100 may include the alignment layer 11 disposed on the pixel electrode 191 and the light blocking member 220*a*. The flowability of the Polyimide may be suppressed as stated above.

The common electrode 270 is formed of a transparent conductive layer such as ITO and/or IZO on the substrate 210, the alignment layer 21 is disposed onto the common electrode 270, and the sealant 310 is formed, thereby forming the common electrode display panel 200 disposed facing the thin film transistor display panel 100. Accordingly, the height of the sealant 310 may be formed substantially equal to or higher than the height of the cell gap considering that the sealant may be pressed.

The liquid crystal molecules 300 may be dropped on the thin film transistor display panel 100, and the thin film transistor display panel 100 and the common electrode display panel 200 may be assembled together to form the liquid crystal display.

The method for manufacturing the liquid crystal display according to the exemplary embodiments of FIG. 5 has been described, but the exemplary embodiments are not limited thereto. According to one or more exemplary embodiments, the light blocking member 220*a* may be formed of a photosensitive material, and a portion of the photosensitive material exposed to incident light may be removed, and accordingly, the mask illustrated in FIG. 6 may include the maximum gray scale and the minimum gray scale having inverted transmittance.

According to an embodiment of the present invention, in the method for manufacturing the liquid crystal display, the overflow and curl of the liquid crystal molecules and polyimide solution may be reduced or prevented by suppressing flowability of the liquid crystal molecules and the polyimide solution.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display comprising:

a substrate comprising a display region and a non-display region;

a light leakage preventing layer disposed on the substrate along the non-display region; a step providing layer disposed on the light leakage preventing layer;

a hydrophobic layer disposed on the step providing layer; and a light blocking member disposed on the substrate, wherein the hydrophobic layer and the light blocking member are formed of substantially identical material and the hydrophobic layer has an upper surface comprising a concentration of fluorine higher than other portions of the hydrophobic layer.

2. The liquid crystal display of claim 1, further comprising a gate electrode disposed on the substrate, wherein the light leakage preventing layer and the gate electrode are formed of substantially identical material.

3. The liquid crystal display of claim 2, further comprising a color filter disposed on the substrate, wherein the step providing layer and the color filter are formed of substantially identical material.

4. The liquid crystal display of claim 2, wherein a color filter is disposed on the substrate, the color filter comprising a blue color filter, wherein the step providing layer and the blue color filter are formed of substantially identical material.

5. The liquid crystal display of claim 1, further comprising:

an additional step part disposed on the light blocking member, the additional step part overlapping the light blocking member and a portion of the step providing layer.

6. The liquid crystal display of claim 5, further comprising a gate electrode disposed on the substrate, wherein the light leakage preventing layer and the gate electrode are formed of substantially identical material.

7. The liquid crystal display of claim 6, further comprising a color filter disposed on the substrate, wherein the step providing layer and the color filter are formed of substantially identical material.

8. The liquid crystal display of claim 1, wherein, the light leakage preventing layer comprises two lines of light leakage preventing layers, the step providing layer comprises two lines of step providing layers, disposed respectively on the two lines of light leakage preventing layers, and the hydrophobic layer comprising two lines of hydrophobic layers, disposed respectively on the step providing layer.

9. The liquid crystal display of claim 1, wherein the step providing layer comprises an opening exposing the light leakage preventing layer, and a part of the hydrophobic layer is disposed on the light leakage preventing layer, forming a deep well shape.

* * * * *